United States Patent [19]

Lee et al.

[11] 4,424,592
[45] Jan. 3, 1984

[54] SOLAR PUMPED LASER

[75] Inventors: Ja H. Lee; Frank Hohl; Willard R. Weaver, all of Newport News, Va.

[73] Assignee: The United States of America as represented by the Administrator of the National Aeronautics and Space Administration, Washington, D.C.

[21] Appl. No.: 327,658

[22] Filed: Dec. 4, 1981

[51] Int. Cl.³ .................. H01S 3/091; H01S 3/22
[52] U.S. Cl. .................................. 372/79; 372/55
[58] Field of Search .................. 372/79, 55, 70

[56] References Cited

U.S. PATENT DOCUMENTS 4,264,876  4/1981  Jung et al. .................. 372/79

Primary Examiner—James W. Davie
Attorney, Agent, or Firm—Howard J. Osborn; John R. Manning; William H. King

[57] ABSTRACT

A solar pumped laser in which the lasant is a gas that will photodissociate and lase when subjected to sunrays. Sunrays are collected and directed onto the gas lasant to cause it to lase.

2 Claims, 8 Drawing Figures

SOLAR PUMPED LASER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The invention relates generally to collecting and converting solar energy to high power laser energy and more specifically concerns direct solar-pumped gas lasers.

The concept of collecting and converting solar energy to high power laser energy has stimulated studies of various laser systems and their applications. Important applications considered include laser propulsion of space- or air-borne vehicles and laser power transmission to remote spacecraft from a space platform. Also laser power transmission is an alternative to the microwave power transmission from space to Earth. The use of lasers in space for power transmission has a significant advantage over microwaves because of small beam divergence, resulting from wavelengths that are smaller by approximately $10^4$. However, space deployment places special requirements on the laser system. Important are: (1) a gas or liquid phase lasant to effect continuous cooling and recharging for high power (more than 1 MW) operation; (2) high temperature operation to reduce cooling requirements; (3) chemical reversibility to renew the lasant in space; and (4) broadband pumping to efficiently use the solar spectrum. Although power transmission by conventional lasers is possible with electric power generated in space, a direct solar pumped laser offers the further advantage of weight reduction by elimination of the electrical power generation.

In the past a solid-state, $Nd^{3+}$:YAG laser was solar pumped. The power output of a solid-state laser is limited by an inability to cool the laser rod; hence, scalability to high powers is precluded. The $Nd^{3+}$:YAG achieved a maximum peak output power of about 5 watts. Input powers increase in proportion to output powers. Eventually the heat transfer characteristics of a solid laser rod limit the input power or melting of the rod will occur.

Also, a gas dynamic solar-powered laser has been suggested. This type of laser is only sun-powered, not directly solar-pumped because it uses the sun only to thermally heat the gas lasant and not to directly make the gas lase. Extra heavy equipment is required to heat and recirculate the gas because in effect the system is a subsonic wind tunnel. The gas reaches high temperatures and velocities which means the gas has to be cooled and slowed before it is recirculated.

"Solar pumping" as used in this specification means that the sun directly and immediately makes the gas lase. The sunlight photodissociates the lasant to form an excited atom in a particular energy state that upon de-excitation does so with the emission of coherent radiation, or lases. The chemistry and physics instantly take place in a stationary gas. The sun is not used for heat, flowing of the gas is not required for lasing, no supersonic nozzle expansion is required, and no shocking down to subsonic flow is required.

It is an object of this invention to provide a direct solar-pumped gas laser.

Another object of this invention is to provide direct conversion of broadband, incoherent solar radiation into coherent laser radiation using a gaseous lasing medium.

A further object of this invention is to provide a solar pumped laser which has high temperature operation thereby reducing cooling requirements.

Still another object of this invention is to provide a solar pumped laser in which a gas lasant is used to effect continuous cooling and recharging for high power.

a still further object of this invention is to provide a solar pumped laser which uses a gas lasant that is chemically reversible to renew the lasant in space.

Other objects and advantages of this invention will become apparent hereinafter in the specification and drawings.

SUMMARY OF THE INVENTION

This invention collects sunlight and directs it onto a laser cavity filled with a gas lasant. The gas lasant by means of sunlight is made to lase by photodissociation of the gas. For example, the gases $C_3F_7I$ and $(CF_3)_2AsI$ can be made to lase by the photodissociation of I from the gases by sunlight.

DETAILED DESCRIPTION OF THE INVENTION

Figure 1:
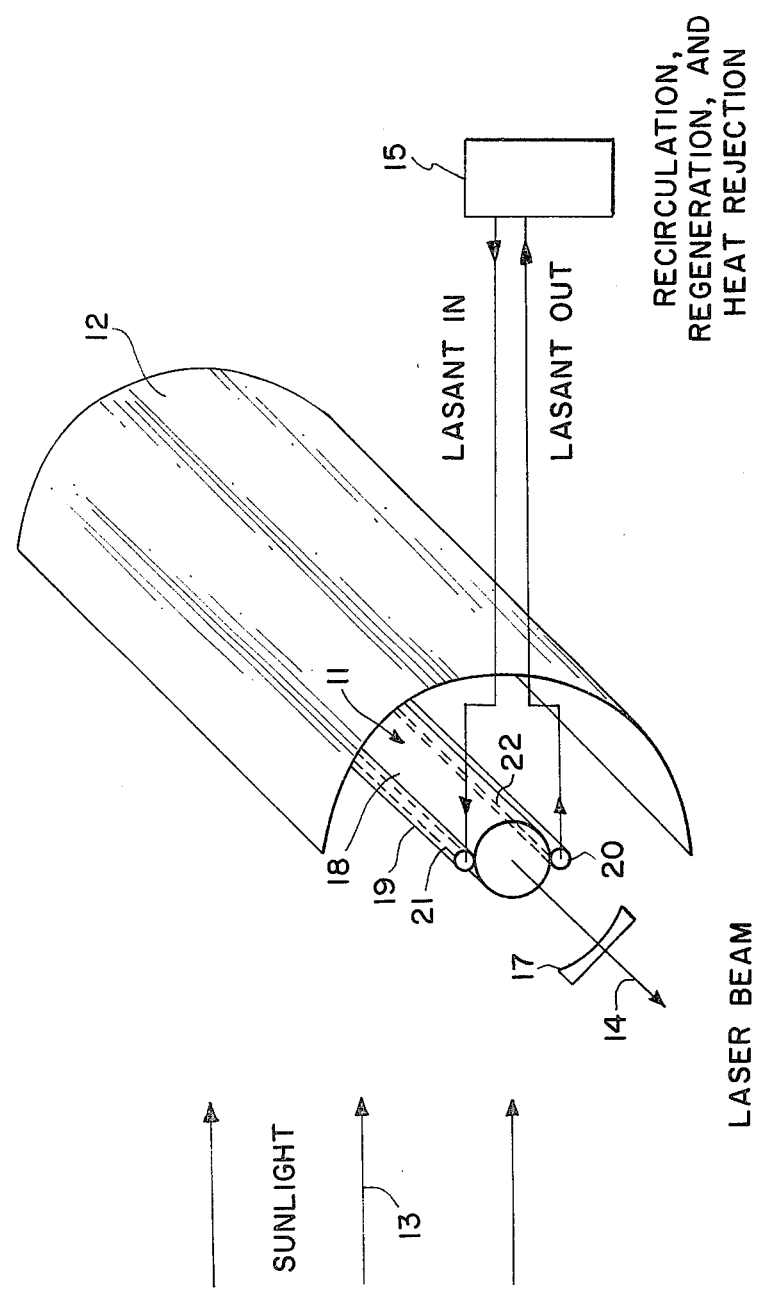
FIG. 1 is a schematic drawing of the embodiment selected for illustration in the drawings.
Figure 2:
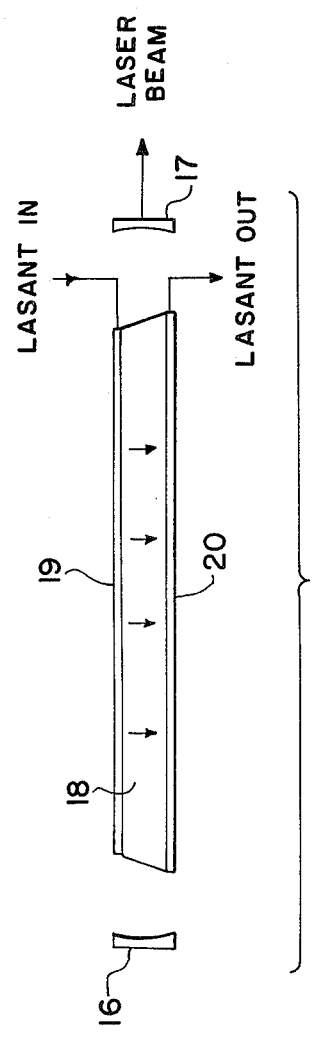
FIG. 2 is a schematic drawing of the laser cavity shown in FIG. 1.

Turning now to the embodiment of the invention selected for illustration in the drawings the number 11 in FIG. 1 designates a laser cavity which is shown in more detail in FIG. 2. A collector 12 collects sunlight 13 and directs it onto laser cavity 11 producing a laser beam 14. The lasant in laser cavity 11 is a gas in which one of the elements of the gas can be photodissociated chemically from the gas by means of the sunlight 13 and thereby causes the gas lasant to lase. Examples of gas lasants that can be used are $C_3F_7I$ and $(CF_3)_2AsI$. These gases lase when the I is photodissociated from the gas by sunlight. Even though it is not essential that the gas lasant is flowing to produce lasing, a continuous system will require some minimum lasant flow through the laser cavity by a recirculation, regeneration and heat rejection system means 15. The heat rejection means is for rejecting waste heat and the regeneration means is for rejuvenating the gas lasant. Recirculation, regeneration and heat rejection means are well known and therefore not disclosed in detail in this specification.

Laser cavity 11 as shown in FIG. 2 includes a first mirror 16 that has approximately 100% reflectivity and a second mirror 17, the laser output mirror, which has approximately 2% transmission, that is the output of the laser. A first large transparent tube 18 with Brewster angle windows at each of its ends contains the gas lasant. The gas lasant is pumped into tube 18 through a second tube 19 and out of tube 18 through a third tube 20. Openings 21 and 22 throughout the lengths of tubes 18, 19 and 20 and between tube 18 and tubes 19 and 20 allow the gas lasant to flow into and out of tube 18 throughout the length of tube 18. Consequently, the gas flows across tube 18 and for a very short distance in tube 18. Alternately, the slits or openings 21 and 22 could be holes spaced along the tubes.

In operation sunlight 13 is collected by collector 12 and directed onto tube 18. As a result the gas in tube 18 lases thereby producing the laser beam 14. Means 15 pumps the gas through tube 18, regenerates the gas (when $C_3F_7I$ is used the I is photodissociated from the gas forming $I_2$ which in sufficient amounts diminishes lasing) and cools the gas (most heat from the sun passes through the cavity for return to space, some absorbed by the gas and cavity walls has to be dissipated).

Figure 3:
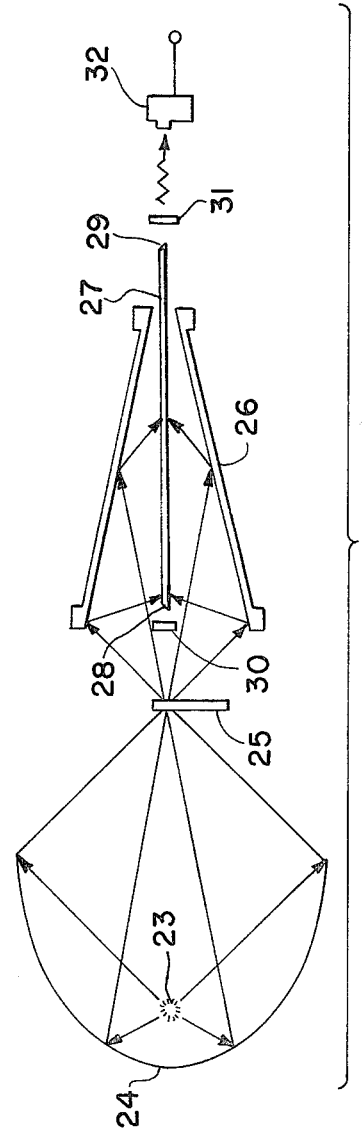
FIG. 3 is a schematic drawing of an experimental device used to prove the feasibility of this invention.

In an experiment, FIG. 3, to prove the feasibility of the present invention, solar energy is simulated by the discharge from a continuous 40-kW xenon arc 23. The discharge from the xenon arc is collected by a reflector 24 to a point at a variable-speed optical chopper 25. The purpose of chopper 25 is to obtain fast rise time pulsed pumping to minimize the quenching effect of molecular iodine, a breakdown component of the lasant. The pulsed light beam from chopper 25 is collected by a highly polished aluminum cone 26 to form a focal line along the cone centerline. The laser tube is an ultraviolet grade quartz tube 27 which has a 7 mm inside diameter, a 1 mm wall thickness, and is 30 cm long. Tube 27 is located on the focal line of cone 26. Cone 26 has a 12.5 degree half-angle, an entrance aperture of 9.6 cm, and is 18 cm long. The laser cavity consists of tube 27 including Brewster angle windows 28 and 29, a dielectric rear mirror 30 with maximum reflectance (99.97 percent at 1.31 $\mu$m) and a front mirror 31 with a reflectance of 98 percent. A germanium detector 32 operated at room temperature senses the laser output.

The 4-kW output of xenon arc 23 is transformed in the experiment into a line focus with an intensity of 10,000 solar constants (half width) for 5 cm of length. The lasant n-$C_3F_7I$, a perfluoropropyliodide, absorbs the radiation between 250 and 290 nm. Photolysis of the lasant produces the upper level $I(5^2P_{1/2})$ of the laser transition of $C_3F_7I + h\nu \rightarrow C_3F_7 + I(5^2P_{1/2})$, and the lower level is the ground state of the iodine atom $I(5^2P_{3/2})$. Laser output is at 1.315 $\mu$m for as long as 10 ms for a single static fill at 10 Torr, and peak power outputs up to five watts were obtained at pressures near 20 Torr.

Figure 4:
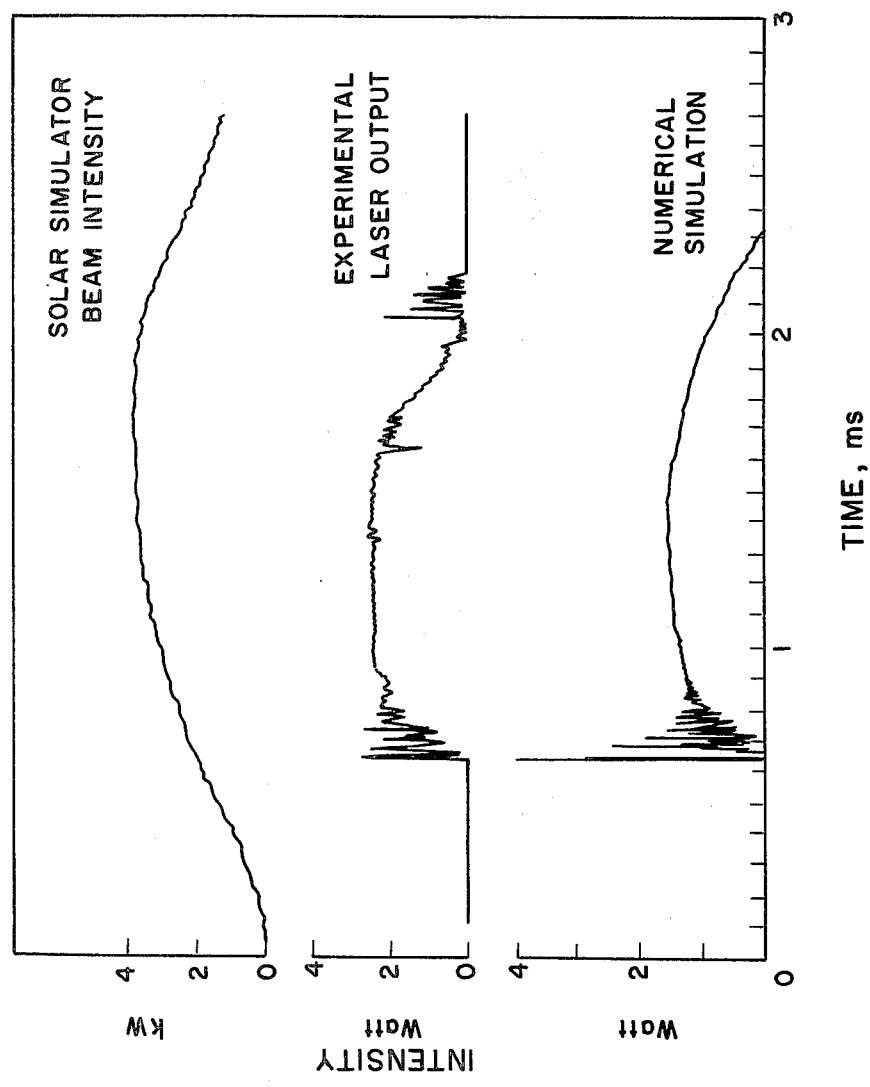
FIG. 4 is curves showing a comparison of the solar simulator output (upper), the laser signal (center), and the results of a numerical simulation (lower)
Figure 5:
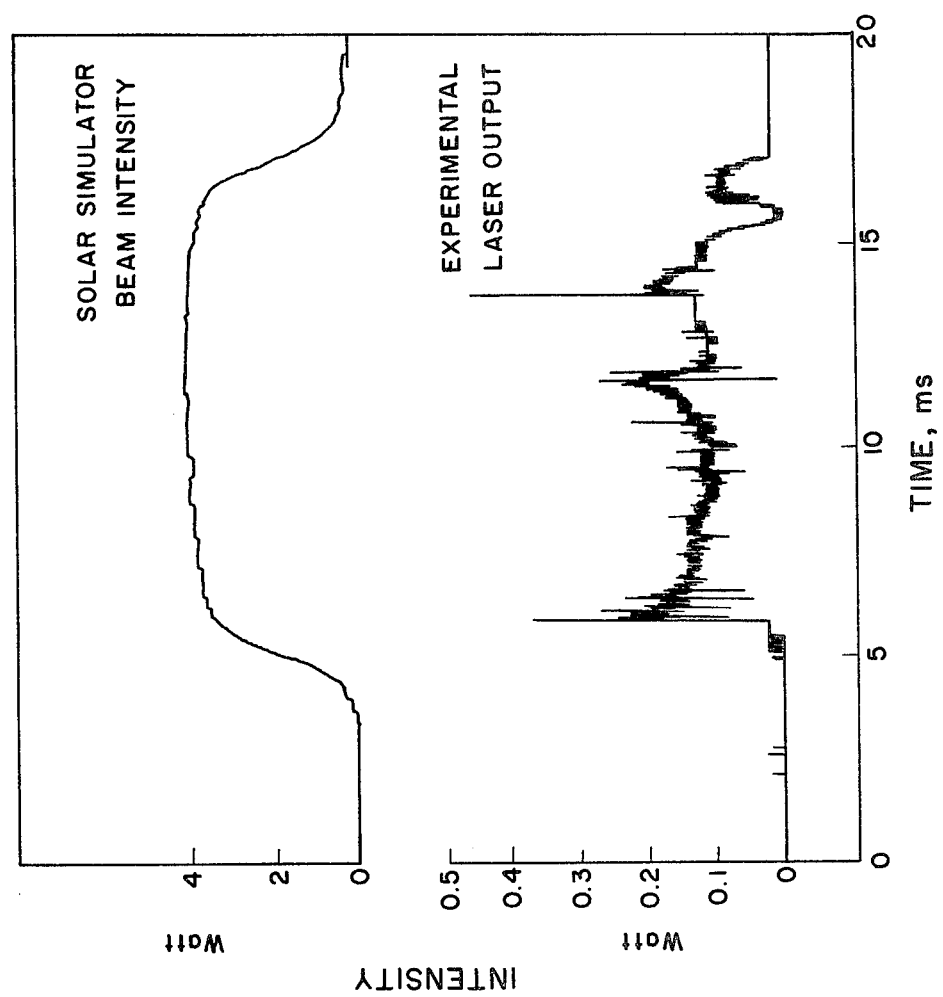
FIG. 5 is curves showing continuous lasing of $C_3F_7I$ for over 10 ms for single static filling.
Figure 6:
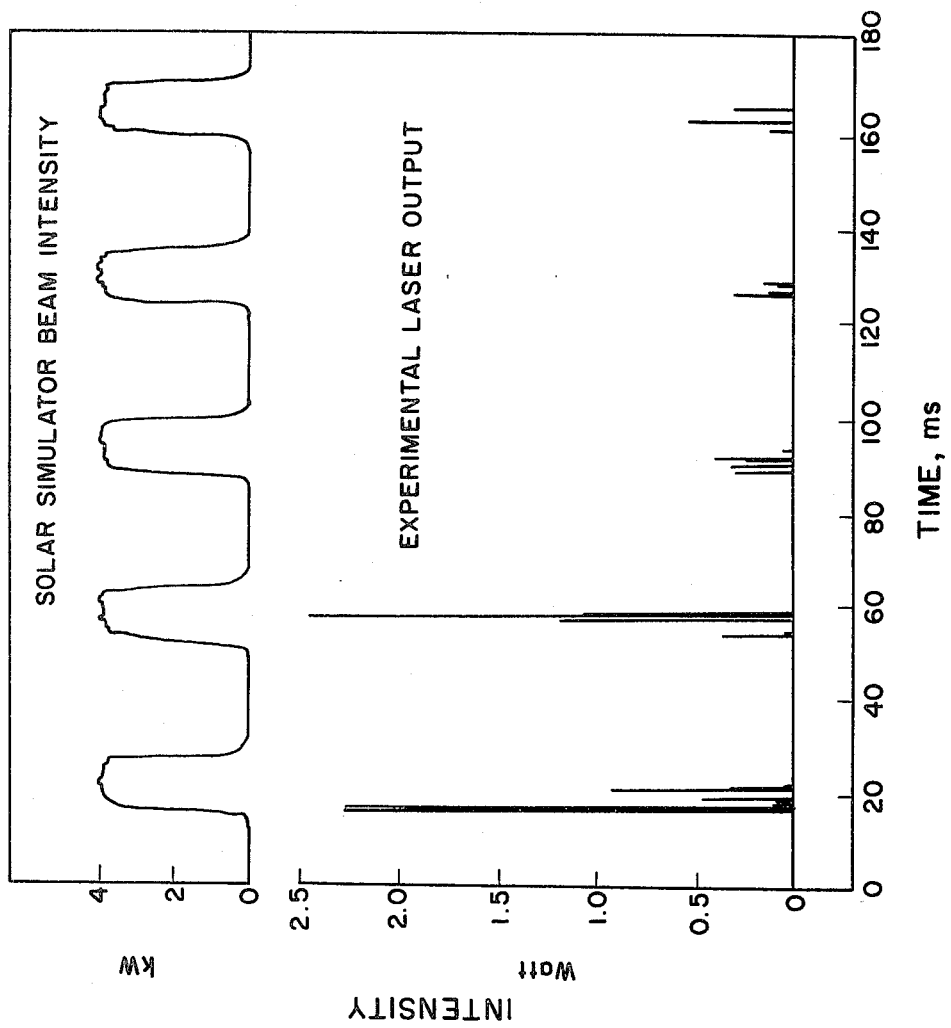
FIG. 6 is curves showing a 30 Hz pulsed $C_3F_7I$ laser output with the lasant flowing as in a blowdown wind tunel.

A typical laser signal output is shown in FIG. 4 together with the output signal from the FIG. 3 simulator (upper trace) and a result of the numerical simulation (lower trace). The lasing lasts for 1 ms with the peak power of approximately three watts. The output power was determined with the detector's absolute calibration data and the spot size from the beam profile measurement. The threshold of lasing is reached when the solar simulator output increases to about 50% of maximum intensity. The initial spikes, caused by gain dumping near threshold, and subsequent continuous output (approximately two watts) of the experimental results agree well with those of the numerical simulation. The highest laser peak power output recorded on other tests exceeded four watts, which is comparable to the maximum peak power output (five watts) of the well developed solid-state $Nd^{3+}$:YAG solar laser. For the highest laser output of the present research, the ratio of power out to power in is 0.1%, which is already one-half of the maximum intrinsic, or thermodynamic efficiency and the extraction efficiency, or the ratio of energy deposited to energy extracted from the gas is 20 percent. Continuous lasing was obtained for over the entire pump period, 10 ms, at a reduced fill pressure of about 10 Torr (FIG. 5). When the lasant was flowed through the laser tube as in a blowdown wind tunnel, a 30-Hz pulsed output was observed in excess of 150 ms (See FIG. 6). The decrease of the laser output with time in FIG. 6 is mainly due to insufficient flow speed.

Figure 7:
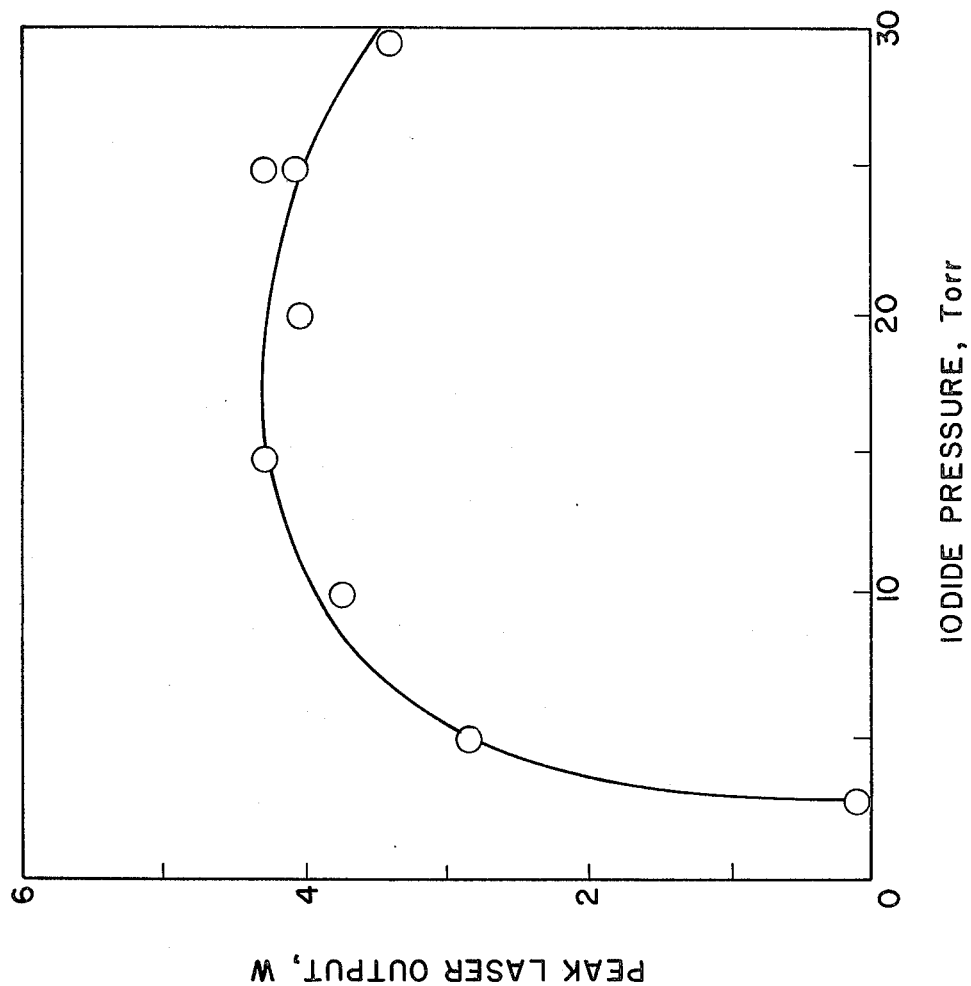
FIG. 7 is curves showing laser output as a function of $C_3F_7I$ pressure.

FIG. 7 shows the variation of the laser output as a function of lasant pressure. The pressure range from 2 to 2.7 kPa (15–20 Torr) produced the maximum laser output, a result which also agrees well with the numerical simulation result of 2 kPa.

The experimental results presented here are significant because the lasant is in gaseous form which can be circulated for external cooling and reprocessing, the iodine laser is a high power laser which has already been developed to terawatt levels as a laser-fusion driver indicating virtually unlimited scalability, and the lasing wavelength of 1.315 $\mu$m allows the use of well developed optical materials for high power infrared lasers. Furthermore, the iodine laser can be operated in a high temperature (up to 700 K.) environment which significantly reduces cooling requirements in space.

Figure 8:
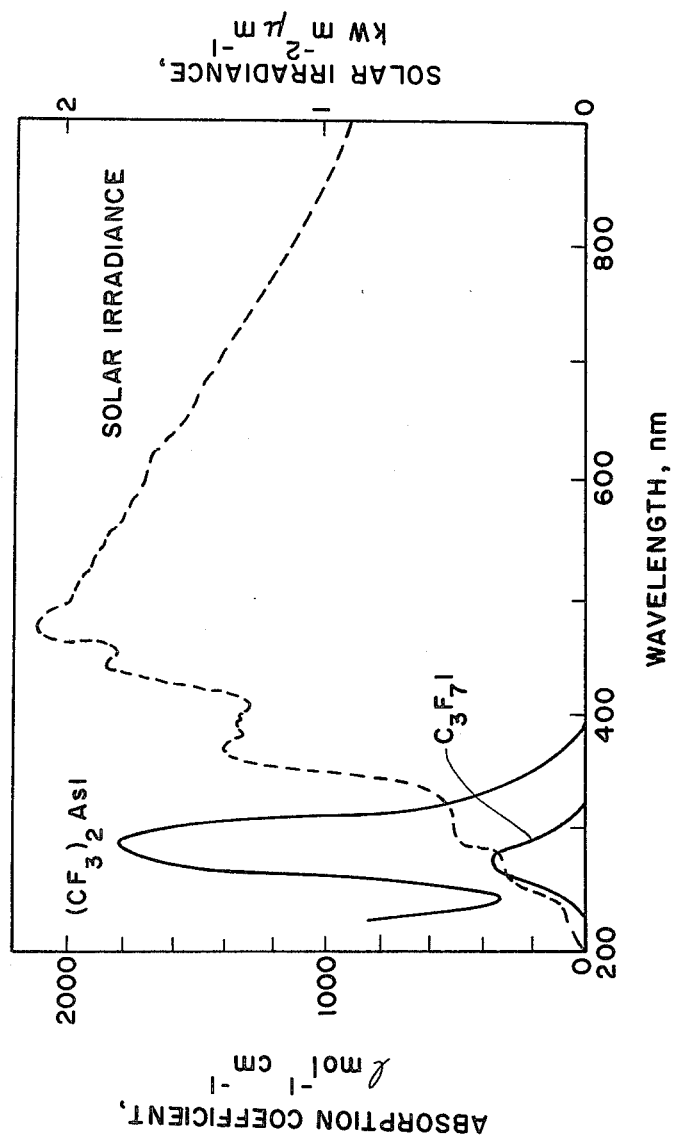
FIG. 8 is absorption curves of perfluoropropyliodides and air mass zero solar spectrum.

Two factors limiting the laser output of the FIG. 3 experiment are power input and mismatch between the lasant absorption band and the peak of the solar spectrum. The first factor is not a limitation in space where a large solar collector could be placed. Indeed, the beam power used in the experiment could be collected with only a 2-m diameter collector. The second factor can be improved with an alternate iodide such as $(CF_3)_2AsI$ which absorbs seven times the amount of the solar spectrum as the $C_3F_7I$ (see FIG. 8). In addition, the reduced output in successive pulses (FIG. 6) of the present laser can be overcome by a closed cycle flow system that removes the accumulated $I_2$ and replenishes the iodide consumed, the two causes of quenching.

The advantages of this invention are: it provides direct conversion of broadband, incoherent solar radiation into coherent laser radiation using a gaseous lasing medium, it provides high temperature operation thereby reducing cooling requirements, it uses a gas lasant that is chemically reversible to renew the lasant in space and since a gas lasant is used the lasant can be cooled and recharged for high power operation.

Other gas phase lasants such as iodine bromide or nitrosyl chloride can be used as the gas lasant since these lasants are also excited by photodissociation resulting from absorption of wavelengths within the solar spectrum.

What is claimed is:
1. A method of direct solar pumping a laser comprising the steps of:
  providing in a laser cavity a gas lasant $(CF_3)_2AsI$ which will lase when subjected to sunlight by pho- todissociation of the element I from the gas lasant; and collecting sunlight and directing the collected sunlight onto the laser cavity to cause lasing of the gas lasant by photodissociation.

2. A direct solar pumped laser system comprising:

a laser cavity including two mirrors and a chamber having walls transparent to sunlight and filled with a gas lasant $(CF_3)_2AsI$ which can be photodissociated by sunlight to produce lasing;

means for recirculating the gas lasant through the laser cavity; and means for collecting sunlight and directing it onto the walls of the chamber to cause the gas lasant to lase.

* * * * *